(12) United States Patent
Krishnaprasad et al.

(10) Patent No.: US 8,151,062 B2
(45) Date of Patent: Apr. 3, 2012

(54) CONSISTENCY MODELS IN A DISTRIBUTED STORE

(75) Inventors: Muralidhar Krishnaprasad, Redmond, WA (US); Anil K. Nori, Redmond, WA (US); Amit Kumar Yadav, Andhra Pradesh (IN)

(73) Assignee: Microsoft Corporation, Redmond, WA (US)

( * ) Notice: Subject to any disclaimer, the term of this patent is extended or adjusted under 35 U.S.C. 154(b) by 464 days.

(21) Appl. No.: 12/433,841

(22) Filed: Apr. 30, 2009

(65) Prior Publication Data

US 2010/0106914 A1  Apr. 29, 2010

Related U.S. Application Data

(60) Provisional application No. 61/108,521, filed on Oct. 26, 2008.

(51) Int. Cl.
*G06F 13/00* (2006.01)

(52) U.S. Cl. .................. 711/143; 711/141; 711/E12.03

(58) Field of Classification Search .................. 711/143, 711/E12.03, 141
See application file for complete search history.

(56) References Cited

U.S. PATENT DOCUMENTS

| | | | |
|---|---|---|---|
| 7,370,064 B2 * | 5/2008 | Yousefi'zadeh | 1/1 |
| 7,509,424 B2 * | 3/2009 | Okazaki | 709/226 |
| 7,698,301 B2 * | 4/2010 | Lourdeaux | 707/999.107 |
| 2005/0081097 A1 * | 4/2005 | Bacher et al. | 714/13 |
| 2008/0141332 A1 * | 6/2008 | Treinen | 726/1 |
| 2009/0271412 A1 * | 10/2009 | Lacapra et al. | 707/10 |

* cited by examiner

*Primary Examiner* — Pho M Luu
(74) *Attorney, Agent, or Firm* — Workman Nydegger

(57) ABSTRACT

Systems and methods that designate read/write consistency models based on requirements of a distributed store to increase performance or scale. Such sever loads can be determined via a plurality of mechanisms, including delays in responses by the primary node; setting predetermined threshold limits that if exceeded results in contacting secondary nodes; polling services of the distributed cache periodically and maintaining track of loads on the servers, and the like. The weak or scalable read can occur when read requests are directed to a secondary node, and upon over loading of the primary node.

26 Claims, 11 Drawing Sheets

CONSISTENCY MODELS IN A DISTRIBUTED STORE

CROSS REFERENCE TO RELATED APPLICATIONS

This application claims the benefit of U.S. Provisional Application No. 61/108,521 filed on 26 Oct. 2008 entitled "CONSISTENCY MODELS FOR HIGHER PERFORMANCE IN A DISTRIBUTED CACHE COMMON AVAILABILITY SUBSTRATE" the entirety of this application is hereby incorporated by reference. This non-provisional application further relates to U.S. patent application Ser. No. 12/363,505 filed on 30 Jan. 2009, entitled "DISTRIBUTED CACHE ARRANGEMENT" and U.S. patent application Ser. No. 12/420,364 filed on 8 Apr. 2009, entitled "REPLICATION FOR COMMON AVAILABILITY SUBSTRATE" all of the aforementioned patent applications are incorporated herein by reference in their entireties.

BACKGROUND

Increasing advances in computer technology (e.g., microprocessor speed, memory capacity, data transfer bandwidth, software functionality, and the like) have generally contributed to increased computer application in various industries. Ever more powerful server systems, which are often configured as an array of servers, are often provided to service requests originating from external sources such as the World Wide Web, for example.

Typically, a continuing problem in computer systems remains handling of the growing amount of information or data available. The sheer amount of information being stored on disks or other media for databases in some form has been increasing dramatically. While files and disks were measured in thousands of bytes a few decades ago, now databases of a million megabytes (terabytes) and even billions of megabytes are being created and employed in day-to-day activities.

Furthermore, today applications run on different tiers, in different service boundaries, and on different platforms (e.g. server, desktop, devices). For example, in a typical web application, many applications reside on a server supporting a large number of users; however, some client components of the application can run on desktops, mobile devices, and web browsers, and the like. In addition, advances in connectivity and cheap storage combined with the complexity of software management facilitate on-line services and software-as-a-service. In such services models, applications (and their data) are hosted in central data centers (e.g., referred to as the "cloud") and are accessible and shared over the web.

The distributed applications require support for large number of users, high performance, throughput and response time. Such services orientation also requires the cost of service to be low, thereby requiring the scalability and performance at low cost.

A further challenge in implementing storage systems is support for distribution and heterogeneity of data and applications. Applications are composing (e.g. mashups) data and business logic from sources that can be local, federated, or cloud-based. Composite applications require aggregated data to be shaped in a form that is most suitable for the application. Data and logic sharing is also an important requirement in composite applications.

As explained earlier, data/applications can reside in different tiers with different semantics and access patterns. For example, data in back-end servers/clusters or in the cloud tends to be authoritative; data on the wire is message-oriented; data in the mid-tier is either cached data for performance or application session data; and data on the devices can be local data or data cached from back-end sources. With the costs of memory falling, considerably large caches can be configured on the desktop and server machines. With the maturity of 64-bit hardware, 64-bit CPUs are becoming mainstream for client and server machines. True 64-bit architectures support 64-bit CPUs, data or address buses, virtual addressability and dramatically increase memory limits (to $2^{64}$ bytes). Operating systems (e.g. Windows, Linux) are also upgraded to support and take advantage of 64 bit address-space and large memories.

For example, desktops can be configured with 16 GB RAM, and servers can be configured with up to 2 TB of RAM. Large memory caches allow for data to be located close to the application, thereby providing significant performance benefits to such applications. In addition, in a world where hundreds of gigabytes of storage is the norm, the ability to work with most data in memory (large caches), and readily shift such data from tables/trees to graphs of objects is the key to programmer productivity for next generation applications. Moreover, supplying replication capability to highly available store remains limited to specific type of storage mediums, and is not readily designed for generic use and optimized for substantially high latency requirements.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation customizes read/write consistency models for data cached in a distributed store, via a detection component that detects requirements of the distributed store. Such detection can be based on: a load balancing criteria (e.g., an over-load thereof), criticality of synchronous/asynchronous operations; type of requests forwarded to the distributed store; and the like. In addition, the distributed store employs a Common Availability Substrate (CAS) as part of operations for data transport/consistency. The CAS renders the distributed store scalable and available, and further supervises join/leave operations for nodes of the cluster. Accordingly, the CAS implemented as part of the distributed store can monitor health of nodes, manage life cycle of nodes, create primary/secondary nodes, and overall manage data transport/consistency operations.

In a related aspect, upon detecting requirements of the system, a designation component can implement "strong" and/or "weak or scalable" policies for the read and/or write consistency models of the distributed store. Moreover, the weak or scalable read can occur when read requests are directed to a secondary node, and upon over loading of the primary node. In addition, the detection component can detect overload of the primary node, via a plurality of mechanisms, such as delays in responses by the primary node; setting predetermined threshold limits that if exceeded results in contacting secondary nodes; polling services of the distributed cache periodically and maintaining track of loads on the servers, and the like. Furthermore, a server side dynamic replica creation can be implemented, wherein if overloading is detected (and no back up exists) a new replica can be created dynamically (e.g., on-the-fly) to increase a number of secondary nodes. Likewise, if load on the system is reduced, the replication produced in form of such secondary node can be removed.

According to a further aspect, when the designation component implements a strong write model, the system can ensure that version of the data is the most updated at time of processing the request, and can wait for the backups to acknowledge the receipt of the operation before returning back to the user. Alternatively, if the designation component designates a weak or scalable write model, the system can asynchronously write to the backups or secondary nodes of the distributed store.

Likewise, in a strong read model, the system can direct the reads to the primary node, whereas in a weak read model, it can redirect reads to any of the nodes (e.g., secondary nodes) containing the data. Moreover, if a local cache is involved, the weak writes can translate to a write occurring locally and then asynchronously talking to the backend cache service.

In a related aspect, a plurality of conflict resolutions can further be implemented as part of the distributed store with partitioned cache to further facilitate efficient operation. Typically, in a distributed partitioned cache of the subject innovation, the data is distributed or partitioned amongst the various instances. Each instance can be responsible for a set of partitions of data and is called the "primary" node for those data partitions. In addition, there can exist one or more backups being kept for each partition also spread across the cache. Such instances hold the backup partitions, which can be referred to as secondary nodes.

According to a further aspect, the client can send read (get(key)) and write (put(key, value)) requests to the servers. Moreover a routing table can be maintained in the client, which enables sending the request to the node directly, or alternatively being routed through other server nodes (e.g., gateways). Typically the read and write requests are sent to the primary nodes responsible for that specific partition that holds the key. Likewise, if the weak model is implemented, requests can be forwarded to the secondary nodes.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
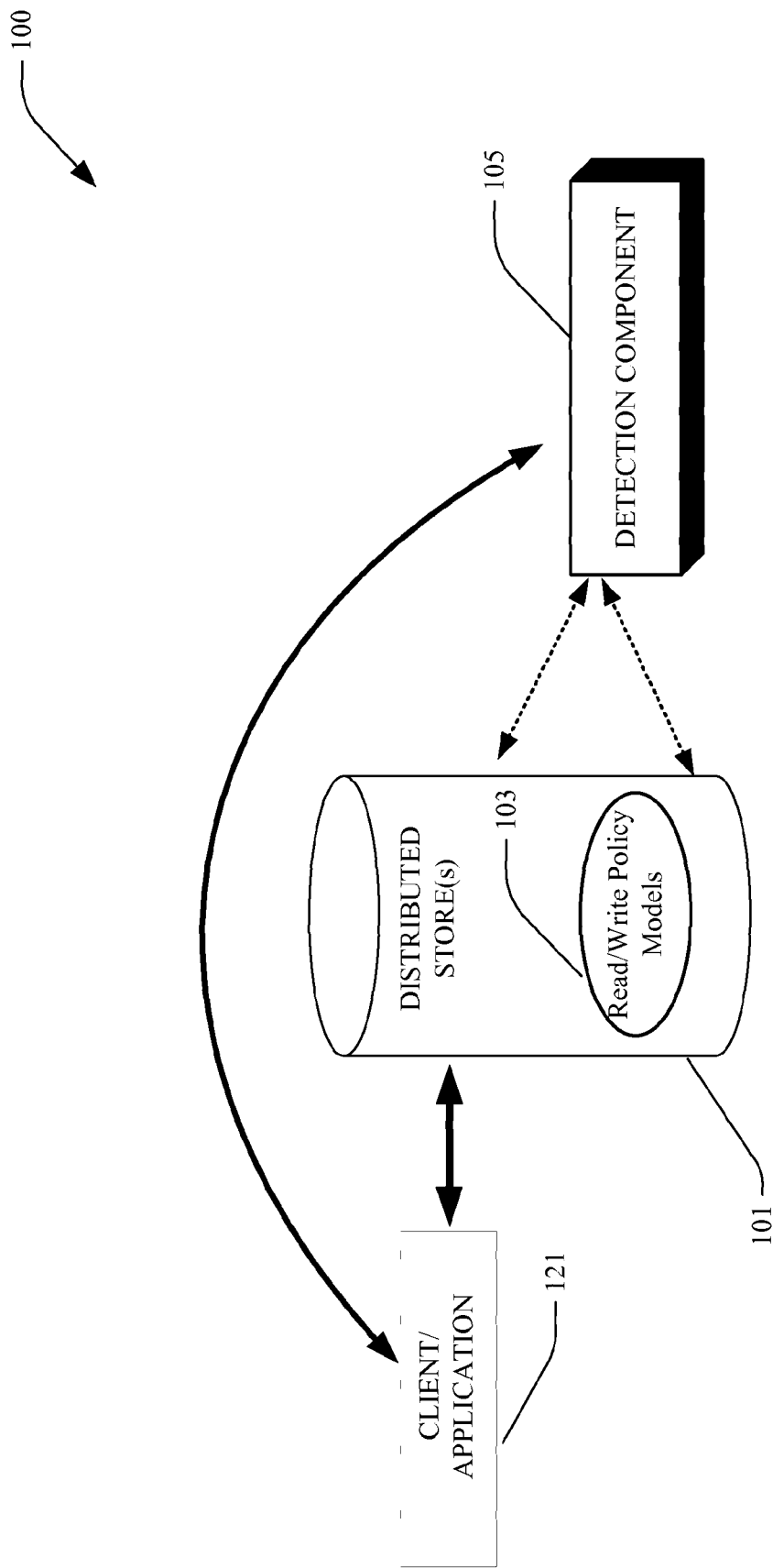
FIG. 1 illustrates a block diagram for a system that enables detecting of server loads for configuration of read and/or write consistency models, according to an aspect of the subject innovation.

FIG. 1 illustrates an exemplary system 100 that includes a detection component 105, which tailors read/write consistency models for data cached in a distributed store 101. The distributed store 101 can be formed by a cluster of nodes such as a plurality of networked machines. In one particular aspect, the distributed store can further include a Common Availability Substrate (CAS) (not shown), wherein such CAS provides the distributed store 101 with data transport and consistency operations to render the system 100 scalable and available, and further supervises join/leave operations for nodes that in part form the distributed store 101 (e.g., monitoring health of nodes, managing life cycles of nodes, creating a primary node on another machine).

Such detection can be based on a load balancing criteria, criticality of synchronous/asynchronous operations, type of requests and the like. Upon detecting requirements of the system, a designation component (not shown) can implement a read/write policy model 103, such as a "strong" and/or "weak or scalable" policies for the read and/or write consistency models of the distributed store 101, as described in detail infra. The weak or scalable read can occur when read requests are directed to a secondary node, and upon over loading of the primary node, as explained in detail below:

Read Scaling

In a read operation the primary node obtains the request, and subsequently observes or looks up/retrieves the key and returns the value back to the client. In a "strong" consistency model, the request is typically forwarded to the primary node. Likewise, for a weak read or read scaling, the reads and associated request can be redirected to a secondary node if the primary node is overloaded.

In particular, for a scenario where the key becomes "hot" such overloading adversely affects performance, since the key cannot be further partitioned and the node now has to be able to handle all the requests for such key—(maintaining a cache closer to the application as local caches can help alleviate such adverse affects; yet such is not feasible if the key is changing rapidly or if there exists a substantial amount of data).

The following provides particular examples, according to a further aspect of the subject innovation:

EXAMPLE 1

Auction Quotes

In typical auction environments, an item that is being auctioned requires participants to look up bid values; and further submit new bids. In such scenarios, a bid cannot be cached locally, since one may not have the "latest" bid available. Likewise, for a case where there exist a substantial number of clients, associated notification costs that are involved in updating the clients can be highly costly. Accordingly, if during a short period an item becomes in high demand, complexities can arise with respect to reads being forwarded to the primary node. To mitigate such complexities, one can also route the reads to the secondary nodes—provided that the consistency can be relaxed.

Moreover, the secondary nodes will not be substantially behind the primary in terms of the writes and there is not a scale issue involved with write propagation (since the number of secondaries is substantially small.) The cache client can detect the heavy load on the primary node and automatically route the request to the secondary node. Such can be specified either as a configuration on the cache or as a special call (GetAny( ) versus GetLatest( ) that would only to the primary). The client will be notified in case data is retrieved from a backup/secondary node, such that it knows that the data can be slightly out of date. Accordingly by relaxing/tailoring the consistency requirement, the subject innovation improves scalability of the distributed cache.

EXAMPLE 2

On Line Retailer

Similarly, for an online retailer that is listing all its catalog information, an item can become in high demand during a short period of time. The catalog can involve details of the item such as videos, documents, and the like. Caching such items locally on the application tier (cache client) is typically not feasible because of the amount of data involved and memory required on the client machines. Accordingly, one can route the request to the secondary node.

Figure 2:
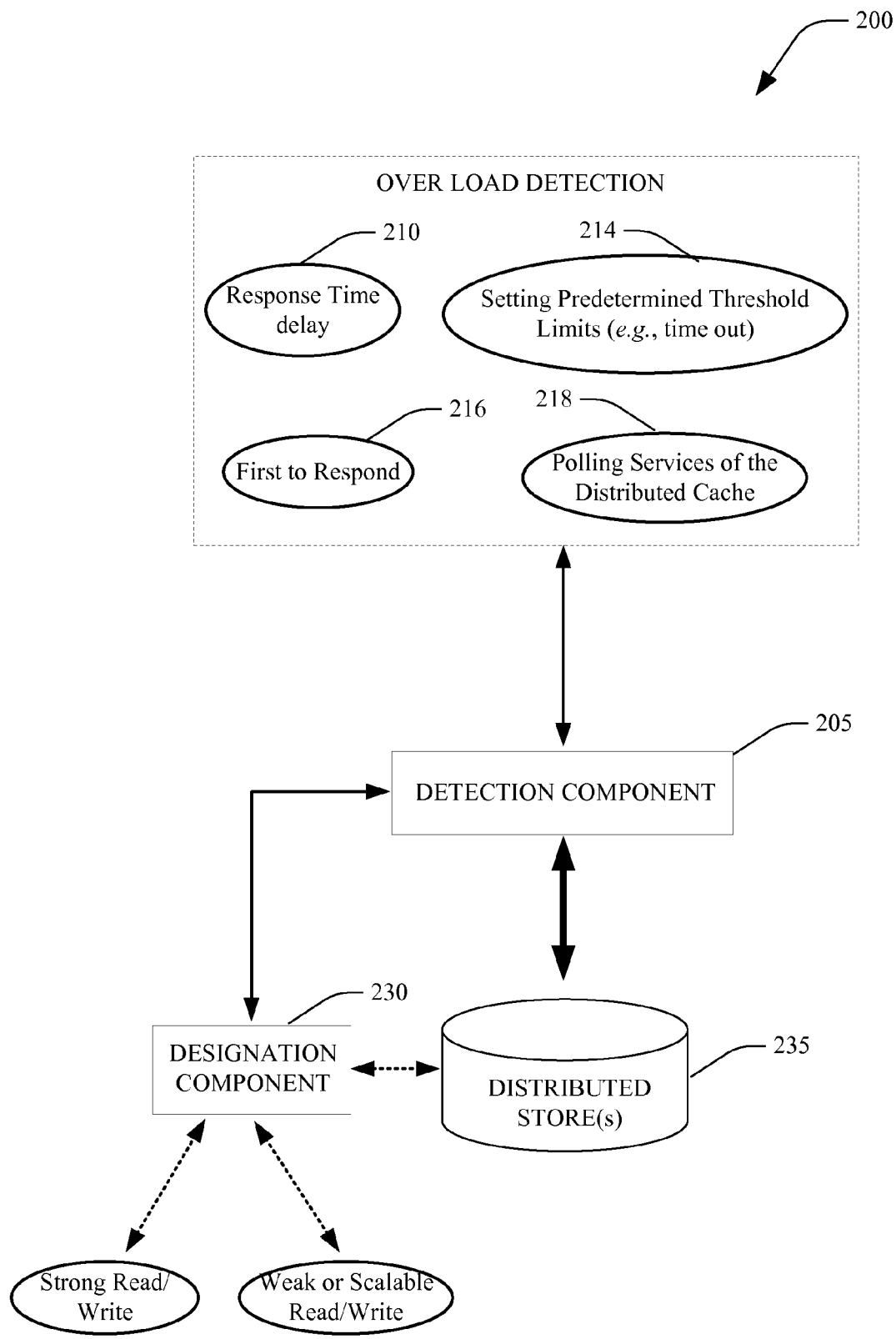
FIG. 2 illustrates a further block diagram of a read/write configuration system according to a further aspect.

FIG. 2 illustrates a particular system 200 that detects a system overload according to further aspect of the subject innovation, wherein the detection component 205 verifies overloading of the primary node, for example. In one aspect, the detection component 205 can detect overload of the primary node, via a plurality of mechanisms, such as delays in responses by the primary node 210; setting predetermined threshold limits 214, which if exceeded results in contacting secondary nodes; polling services of the distributed cache 218 periodically and maintaining track of loads on the servers, order of response 216 between primary and secondaries and the like—as described in detail below. For example, if the primary takes longer to respond or expires (e.g., a time-out), then it can proceed to the secondary. Likewise, if the read latency is critical for the system, requests can be sent in parallel to all primary nodes and secondary nodes. As such, if the primary responds back within an allowable time interval, then information associated with the primary node can be employed—otherwise, information associated with secondary node can be employed.

Moreover, the cache also maintains version numbers along with the cached items. Such a version number can be monotonically increasing value, wherein if one obtains responses from several instances, the version number can be employed to determine the latest value. Furthermore, if the primary returns a non-existence key response, then such item must have been previously removed, and the values obtained from the secondaries can be ignored. The client can ping the servers in a periodic fashion and it can employ the latency involved to keep track of the load on the servers. In a related aspect, the cache service periodically sends load information about the servers to the clients through a pull or push based mechanism. Such can further be employed by the client to determine which instance to choose for the read operation.

Figure 3:
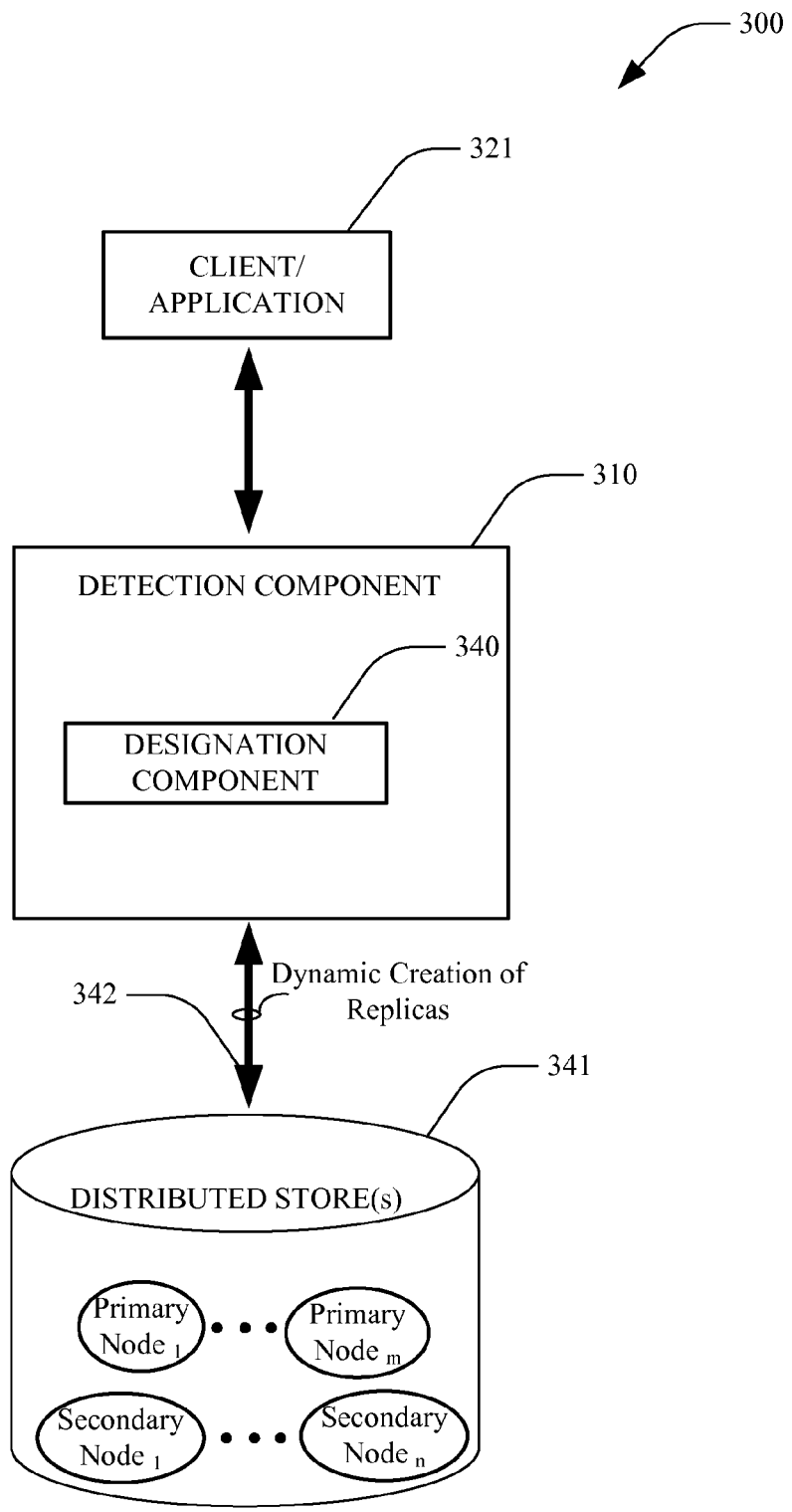
FIG. 3 illustrates an exemplary system that enables dynamic creation of replicas according to an aspect of the subject innovation.

FIG. 3 illustrates a particular system 300 according to a further aspect of the subject innovation, which includes a designation component 340 to implement strong and/or weak scalable policies. Such designation component 340 can implement "strong" and/or "weak or scalable" policies for the read and/or write consistency models of the distributed store. The designation component 340 can be part of the detection component 310, which verifies overloading of the primary node, for example.

As illustrated in FIG. 3, the subset of nodes servers can include primary nodes 1 to m (m is an integer), wherein such primary nodes can represent most updated version of data), and secondary nodes (1 to n, where n is an integer) that represent backup replicas for the data. In addition, by designating a subset of servers to poll—as opposed to polling all servers upon occurrence of a change—tracking operation can be optimized.

In a related aspect, the client/application 321 can register/de-register for notifications of interest. Moreover, when events occur that clients 321 have shown interest therein, associated delegates can be called. In addition, since the server typically does not maintain a client state, change/processing can be minimized. On the server side, a notification manager unit (not shown) associated with the detection component 310 can respond to the client request for CacheEvents for partitions it contains. Such notification manager unit can further take Notification Events directly from a queue associated with common availability substrate (CAS) Replication, which represents operations for data transport/consistency, to render the distributed store scalable and available.

According to a further aspect, on the server side, the notification manager unit responds to the client request for CacheEvents for partitions it contains. Moreover, the notification manager unit can take Notification Events directly from a replication subsystem, employed for replicating data for high availability or other purposes. Furthermore, each update operation performed can obtain a unique sequence number represented by the Logical Sequence Number (LSN) associated with a partition. Such LSN can be generated as part of a replication process (e.g., by noting the current sequence number for operations before the enumeration is begun; and typically returning those items in the partition wherein associated LSN is less than the start LSN), and can be employed to determine the order of the operations within a partition. A partition can also represent a range of ids that are mapped to different nodes. Moreover, regions and keys can be hashed to an ID, wherein keys are then hashed to a region that is further hashed to a space id. The ID can then determine which partition it maps to (based on the id range of the partition), for mapping to a node, for example. In one aspect, the designation component 340 can interact with the detection component to perform the following:

Server Side Dynamic Replica Creation

If an instance of the cache service is overloaded and there are no backup copies for the clients to forward requests thereto, or if all of the primary and secondary nodes are overloaded, then the server starts dynamically creating new replicas at 342. The replica is placed automatically on the instance that has a low load. The client requests can now also start querying this secondary node, thus reducing the load. Conversely, if the load on the system is reduced, such replicas that are dynamically created can then be removed.

Improving Write Performance:

Improving Latency

As explained earlier, when a write operation is sent to a primary node, the primary node sends the write to the secondaries (one or more) in parallel and awaits a return acknowledgement. Various quorum mechanisms can be implemented; and hence it is not necessary to wait for a return response from all of the machines—yet there exists a minimum latency required for talking to at least one of the secondaries. For applications where the update is not critical, such can cause an unnecessary performance and throughput degradation. One aspect of the subject innovation introduces the concept of a weak write, where the write is simply forwarded to the primary and the primary applies the operation and immediately acknowledges such to the client. Asynchronously the primary then sends the information to the secondaries. Moreover, the server can send such information in bulk, and thus reducing the bandwidth requirements on the backend.

Scaling Writes

Even with weak writes, if a particular set of items on a partition is "hot" then a single machine may not be able to handle the load. In such cases, the writes can be further partitioned amongst the primary and secondary. Such can be handled at the level of regions, wherein the system of the subject innovation groups cache items together into regions that can then be grouped into partitions. As such, the clients start routing write requests to the secondary nodes for certain set of regions. Such can further be decided by the primary server/node. The primary server/node then polls the secondary server asynchronously to update the data. Moreover, such can employ the LSN information to only obtain the changes that it needs from the secondary. The secondary nodes can also post the changes to the primary. Both such operations can be performed in bulk thus alleviating network overload. In addition, such routing to the secondary can be done on the client or by the primary server itself based on the region information.

Scaling Writes on the Client

Even with the mechanisms described above, if the writes to a specific region increases (e.g., items become hotter), or if the application is substantially latency sensitive, then the cache client can itself perform the writes asynchronously to the backend. If a local cache is present on the client, then the writes performed locally on the client can also be asynchronous. There exists two cases—wherein the user can have "updated" an existing key or added a new key.

When updating an existing key, one can employ the cache item version to detect any conflicts when applying the change asynchrously to the backend. When a cache item is read into the cache, the version information is also read along with it. The version is atomically incremented in the backend cache service anytime an update is performed. Sending the newer cache item and the version being read thereby can facilitate detecting whether there exists any conflict in the backend.

Alternatively, if a new key is added and the changes are sent to the backend, one can overwrite other changes that might have happened since then. To prevent such cases and based on configuration settings or through an explicit application API the system can:

a. maintain a last LSN for each partition. When sending the update asynchronously it also sends the last LSN and the cache item. The server maintains a list of operations that have occurred with their corresponding LSN. It can quickly search the list to check if any remove or add operations have happened since that time and then either accept or reject this operation. The cache client can then reject the operation and notify the application. Such represents a strong model where any changes to the key invalidates the write operations.

b. send the operation and if there is an entry already present the server rejects the operation. The client then notifies the application that the write has failed. This is a slightly weaker model since at the time of insertion if there is no key present the operation succeeds.

c. overwrite the value with the latest value.

Likewise, if a key is removed by the user, similar issues can arise. For example, the system can perform the same actions as indicated earlier for the update scenario.

Figure 4:
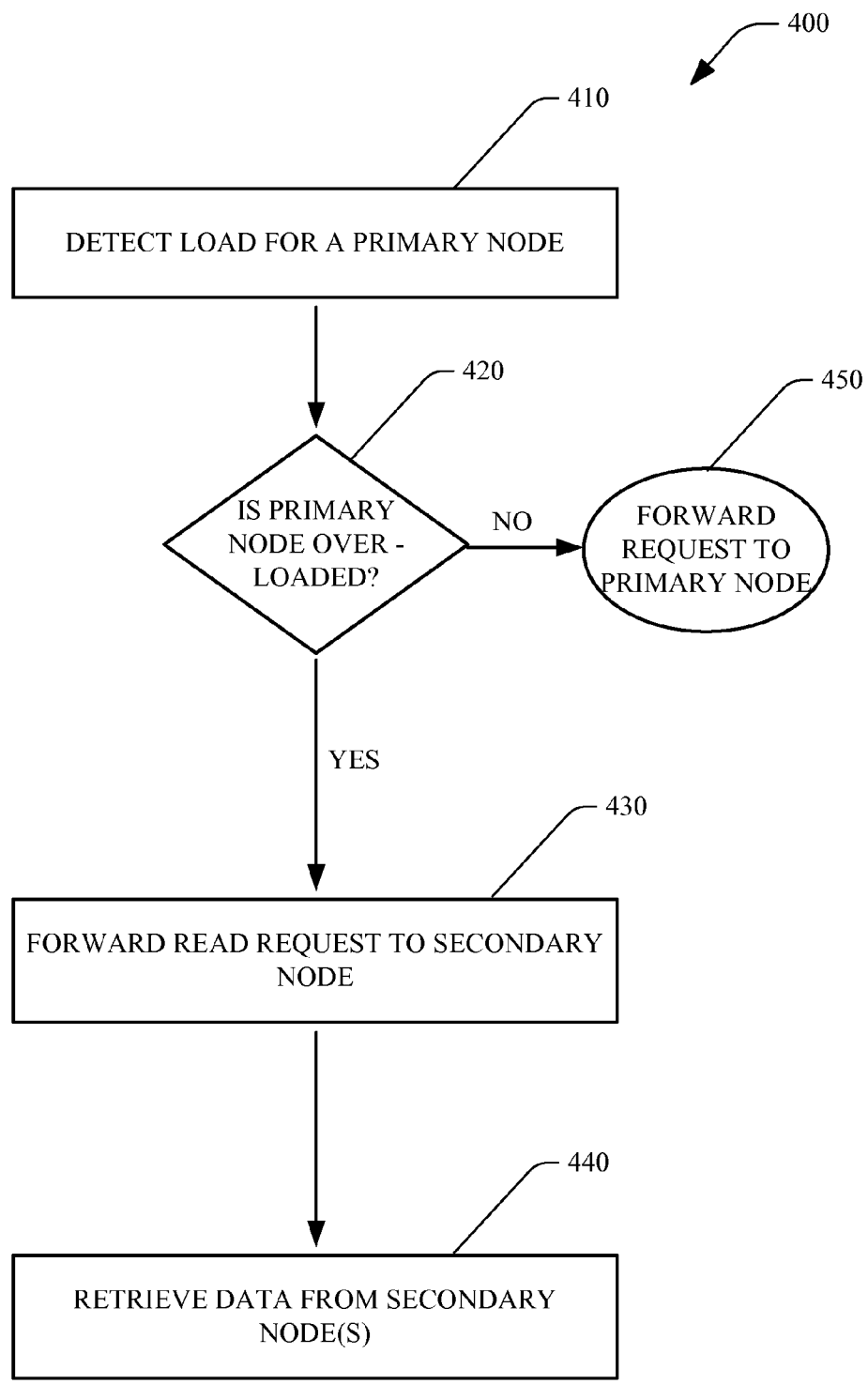
FIG. 4 illustrates a particular methodology of a weak read according to a further aspect of the subject innovation.

FIG. 4 illustrates a related methodology 400 for a weak read according to an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 410 a load for a primary node can be detected and also verified if the primary node is over loaded. As explained earlier, a plurality of mechanisms can be employed to detect overload in the primary node including delays in responses by the primary node; setting predetermined threshold limits that if exceeded results in contacting secondary nodes; polling services of the distributed cache periodically and maintaining track of loads on the servers, and the like.

Subsequently, and if a determination is made that the primary node is overloaded at 420, then the read request can be forwarded to a secondary node at 430. As such, data can be retrieved from secondary nodes at 440. Alternatively, if a determination is made at 420 that the primary node is not over loaded, the request can be forwarded to the primary node.

Figure 5:
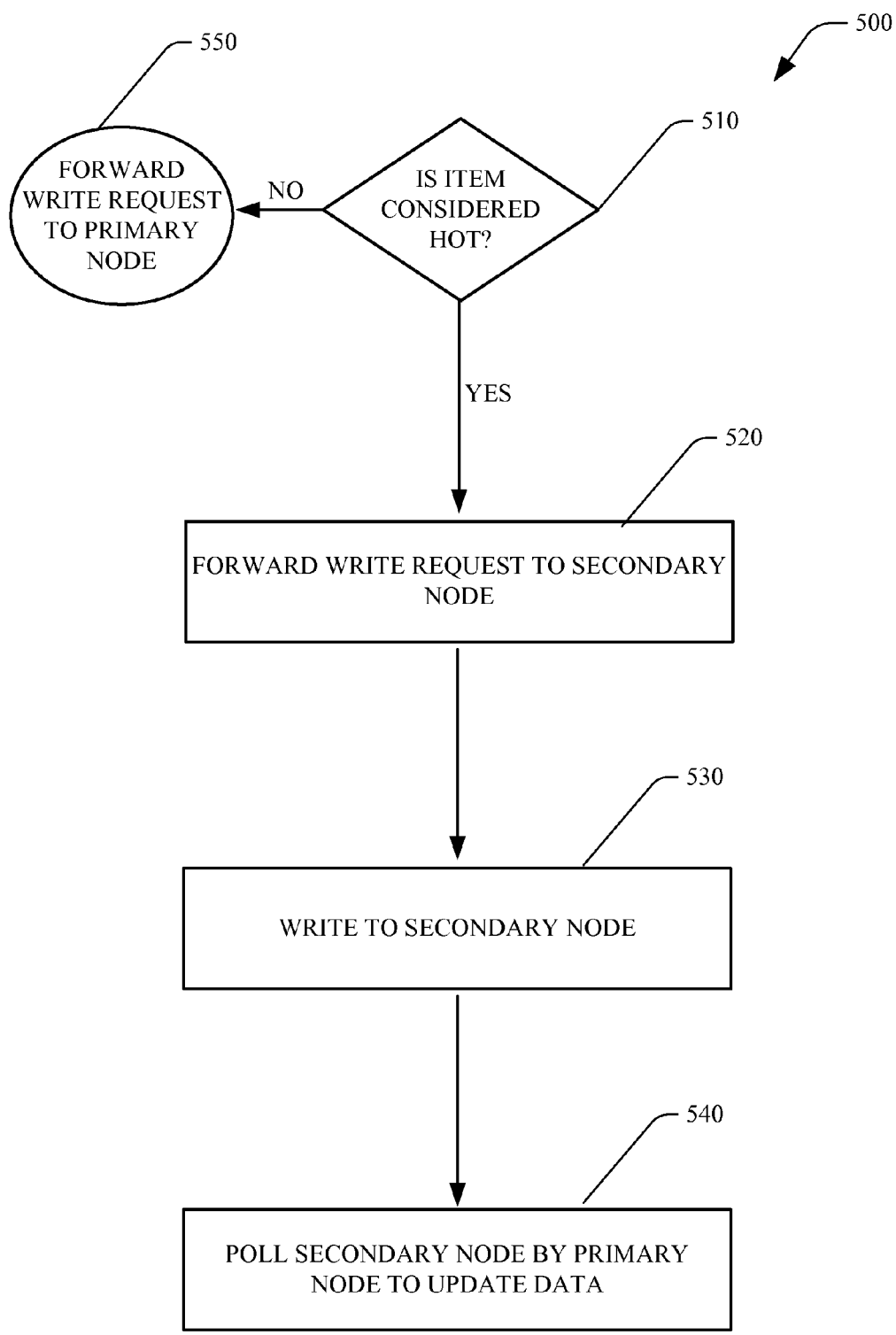
FIG. 5 illustrates a particular methodology of a weak write according to an aspect of the subject innovation.

FIG. 5 illustrates a related methodology 500 for a weak write according to an aspect of the subject innovation. Initially and at 510 a determination is made regarding whether an item is hot, which can cause a primary server to become overloaded from a substantial amount of requests being forwarded thereto. Next and 520, write requests can be forwarded to the secondary nodes. Such requests can then be written to the secondary nodes. Subsequently and at 540 the secondary node can be polled by the primary server for updating the item(s) therein.

Figure 6:
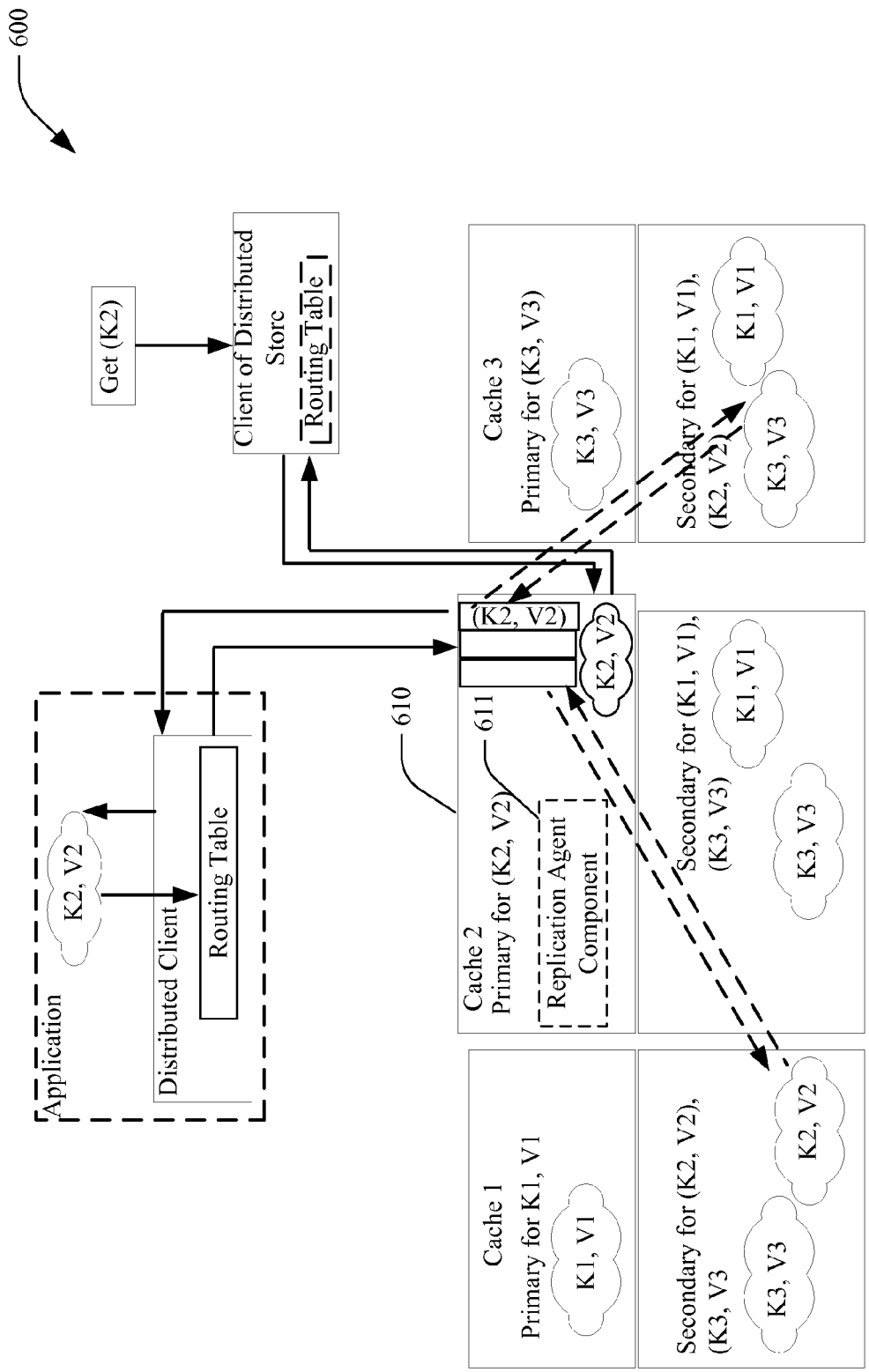
FIG. 6 illustrates a replication operation according to an aspect of the subject innovation.

FIG. 6 illustrates a replication operation, wherein the replication agent component 611 facilitates sending requests to secondary nodes according to a further aspect of the subject innovation. A request is placed in the queue and for every named cache the number of secondary node replications can be introduced (e.g., based on a desired measure of reliability.)

The routing table can subsequently direct replicated data to a node(s) in the cluster, which in part forms the distributed cache.

For example, at cache 2 designated as 610 by using the Routing table—a client of the distributed store routes the "PUT" request for storing/updating data, and places the request to cache 2, which serves as primary node for K2, V2. Such operation can then be propagated to other secondary nodes, wherein upon receiving an acknowledgement for a quorum of nodes, control can then be returned to the client of the distributed store, for example. The replication agent component 611 can employ replication queues for replication of desired data to the secondary nodes. As explained earlier, once data is compacted in the store, such data can be committed on a majority of secondary nodes.

Figure 7:
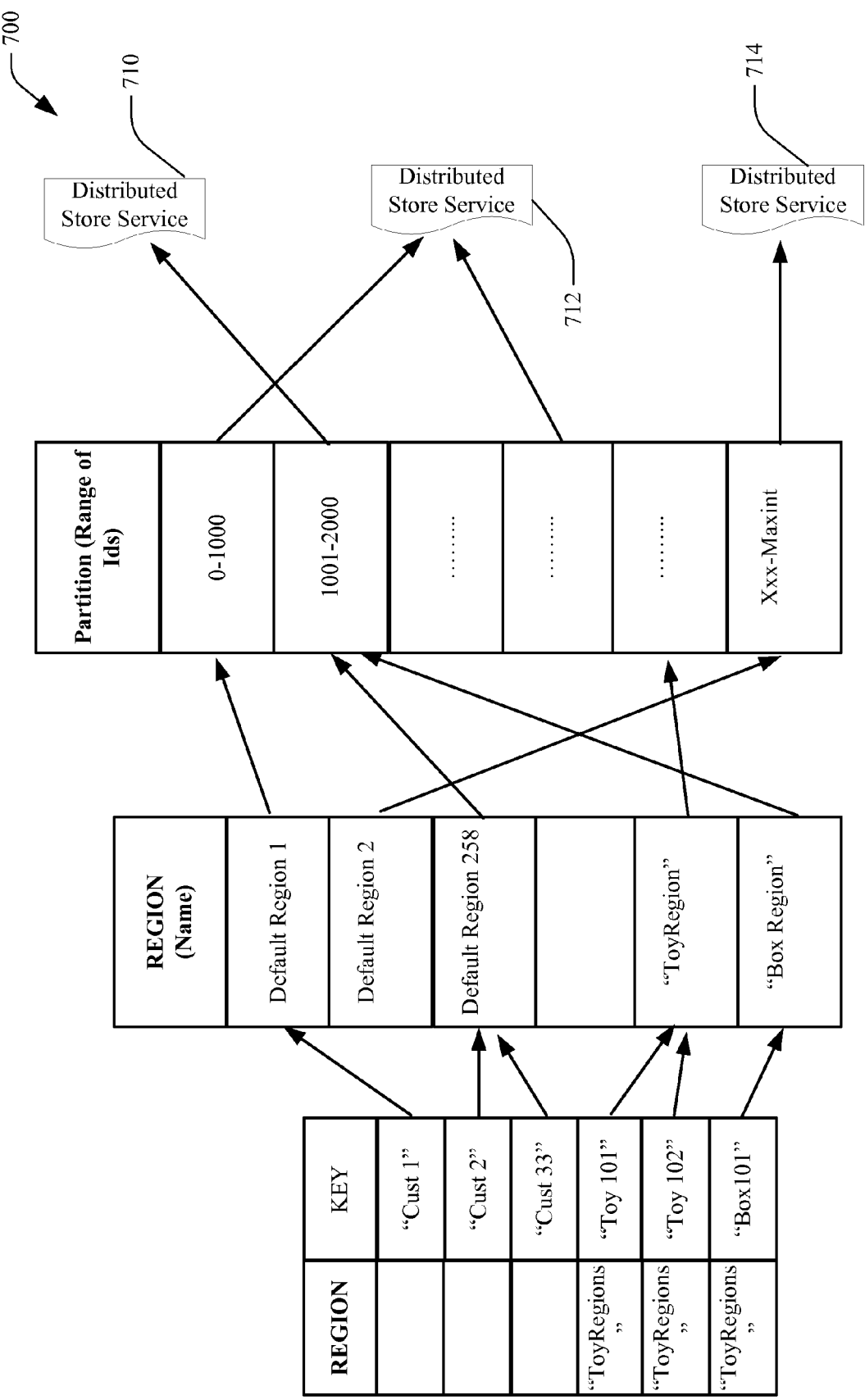
FIG. 7 illustrates a key mapping for ranges of data when mapped to nodes on a distributed store(s).

FIG. 7 illustrates a key mapping 700 for ranges of data when mapped to nodes on a distributed store(s) 710, 712, 714. Based on items to be stored, such as in case of a toy delivery store for boxes corresponding to the toys, two types of regions in form of region and default can be defined—wherein for all data items keys are obtained and hashed identifications mapped into partitions in form of key ranges. Such partitions can further be taken and spread onto different machines that form the distributed store 710, 712, 714. The partition maps can further include both global partition maps and local partition maps. The local partition map can be placed on a node, to supply knowledge about partitions placed on the node. Likewise, the global partition supplies knowledge about all partition maps in the cluster of nodes that form the distributed store. Furthermore, the local cache can maintain items in de-serialized object format and without involving the distributed store. Requests arriving in the local cache can then be synched with primary data being held in the primary node.

Figure 8:
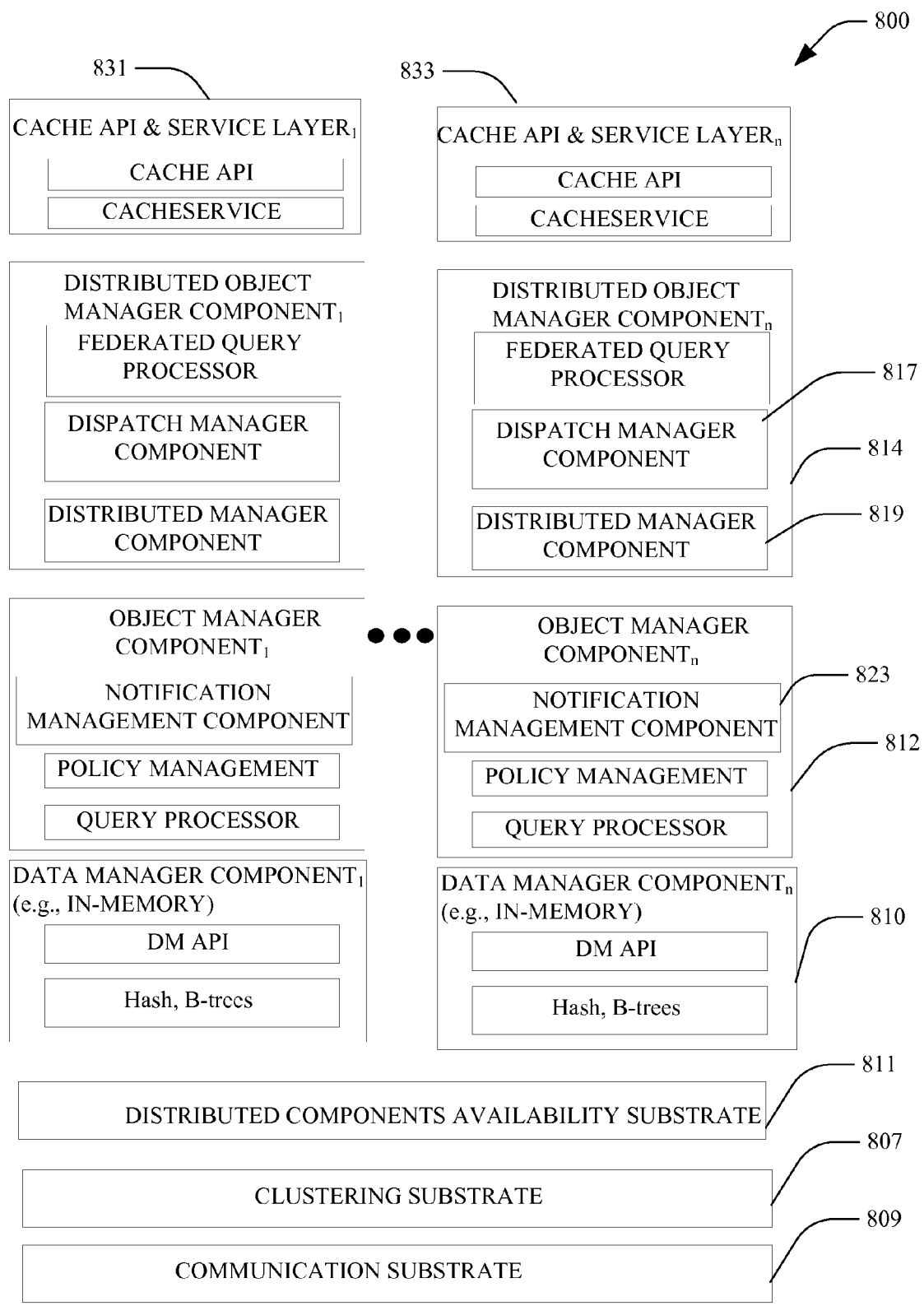
FIG. 8 illustrates a particular layering arrangement for a distributed cache according to a further aspect of the subject innovation.

FIG. 8 illustrates a particular layering arrangement 800 for a distributed cache according to a particular aspect of the subject innovation. Such layering arrangement enables aggregating memory capacity of multiple computers into a single unified cache, according to an aspect of the subject innovation. As illustrated in FIG. 8, each of the cache nodes 831, 833 (1 to n, n being an integer) the layering arrangement 800, which includes a data manager component 810, an object manager component 812 and a distributed object manager component 814—the set up which can be implemented in a modular fashion—wherein, the distributed object manager component 814 is positioned on top of the object manager component 812, which itself placed on top of the data manager component 810. The data manager component 810 supplies basic data functions (e.g., hash functions), and the object manager component 812 implements object facade thereon including cache objects with the distributed object manager component 814 providing the distribution. As such, the object manager component 812 and data manager component 810 can act as local entities, wherein the distributed object manager component 814 performs the distributions. Moreover, a clustering substrate can establish clustering protocols among the plurality of nodes that form the single unified cache.

As explained earlier, the data manager component 810 (e.g., in memory) provides primitive high performance data structures such as hash tables, Btrees, and the like. Since such data manager 810 is memory bound and all operations of the distributed cache of the subject innovation are atomic, it can typically implement highly concurrent hash tables. Such further facilitates creating the infrastructure for supplying containers and indexes on containers. In addition it provides simple eviction and expiration on these hash structures. It is to be appreciated that due to pluggable features supplied by the layering arrangement 800, users can plug in different types of data managers tailored to users' requirements such as; a transaction data manager or a disk paged data manager, and the like. Likewise, the object manager component 812 provides the object abstraction and implements the concept of named caches and region by employing data structures provided by the data manager.

Similarly, the distributed object manager component 814 employs the local object manager and integrates with the Distributed Components 811 to provide the abstraction of the distributed cache. Core to the distributed cache of the subject innovation is the Distributed Components/availability substrate 811 which provides the transport and data consistency operations to make the system scalable and available. The object distribution component can optionally be implemented as part of a client tier to facilitate dispatching requests (e.g., directly) to the nodes associated with the single unified cache.

In one particular aspect, the distributed object manager component 814 can further include a Dispatch Manager component 817 and a distributed Manager component 819. The Dispatch Manager component 817 can further look up the routing table to dispatch the requests to a primary node (e.g., where a region is located) as part of dynamically scalable distributed cache. Moreover, such dispatch manager component 817 can be also present in the client so that the client can directly dispatch requests to the primary node. For example, the distributed object manager 811 on the receiving node can interact with the partition map to check if the node is indeed designated as the primary node as part of a plurality of nodes associated with the distributed cache, and calls the Object Manager component 814 to perform the operation. In the case of write operations, such distributed object manager component 814 can also communicate with a replicator to replicate the data to the secondary nodes. It can also interact with the failover manager systems (not shown) to clone regions to create new secondary or primary nodes during reconfiguration procedures subsequent to possible failures.

The object manager component 812 can further include a notification management component 823 that tracks changes to regions and objects and relays notifications to delegates listening to those events. Moreover, applications can also register delegates for notifications on any node which may be different from the primary node on which the object resides. The distributed object manager component 814 can further manage the propagation of notifications in a distributed fashion including providing high availability for such notifications when the primary node fails. For example, such can be handled by maintaining a local lookup table indexed by delegate id on the node where the application registers the delegate. The primary node that stores the object maintains the delegate id and the originating node information. When such object changes in the distributed object manager component 814, the primary node can notify all the originating nodes passing along the delegate id.

Similarly, the distributed object manager component 814 associated with the receiver can employ the lookup table to call the appropriate delegate, thus providing the change information to the application in a distributed fashion. For example, notifications can be asynchronous and can further be backed up using the same secondary nodes. Accordingly, in the event of failures, the secondary nodes attempt to deliver the pending notifications, wherein during the primary node failure notifications can be resent—since the primary may not have synchronized the information regarding the delivered notifications before failure. Since all notifications carry the region, key and version information, application can use the version to ignore duplicate notifications.

Likewise, the Availability Substrate 811 provides scalability and availability to systems that contain a storage component associated with the distributed cache of the subject innovation. For example, the availability substrate can include load balancers, fail over managers, replicators and the like. Interacting with such availability substrate 811 is the communication substrate 809 that provides for failure detection of nodes and reliable message delivery therebetween. Moreover, the communication substrate 809 provides the communication channels and cluster management. Such communication substrate 809 can provide callbacks whenever a new node joins the cluster or when a node dies or fails to respond to exchanged messages (e.g., heart beat messages). Moreover, the communication substrate 809 can provide efficient point-to-point and multicast delivery channels, and can further provide reliable message delivery that is required for implementing the replication protocols. For example, the communication substrate 809 supports notifications by maintaining delegate information in cache items and triggering the notification when items are modified. Such component also triggers eviction based on policies defined at the region or named cache level.

Figure 9:
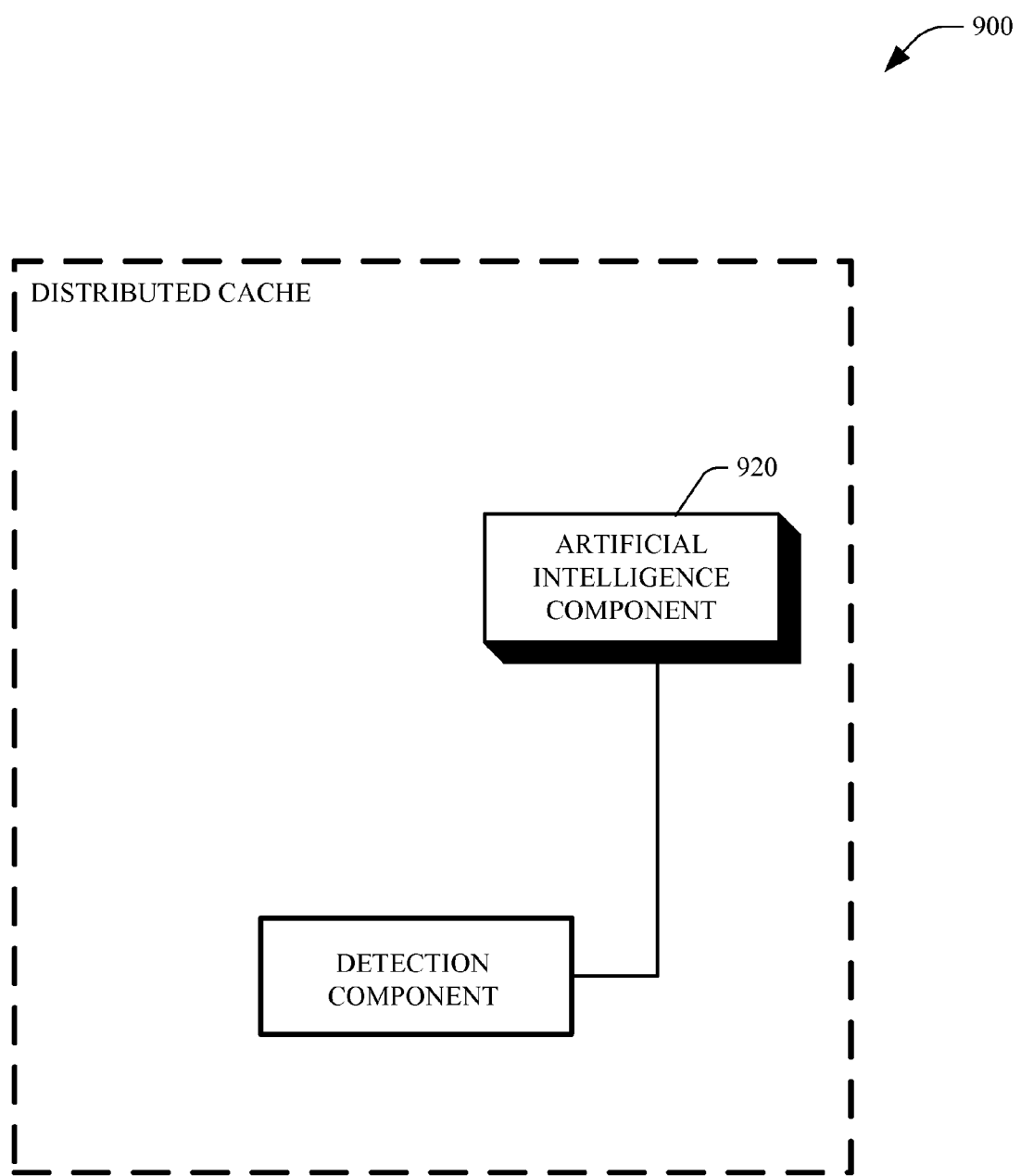
FIG. 9 illustrates an artificial intelligence (AI) component that can be employed to facilitate inferring and/or determining when, where, how to implement a strong or weak/scalable data in a distributed environment according to an aspect of the subject innovation.

FIG. 9 illustrates an inference component in form of an artificial intelligence (AI) component 920 that can be employed to facilitate implementing strong or weak/scalable policies in the distributed cache and/or distribute applications. For example, the artificial intelligence component 920 can supply additional analysis with the distributed cache manager to improve distribution and/or scaling of the system. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The AI component 920 can employ any of a variety of suitable AI-based schemes as described supra in connection with facilitating various aspects of the herein described invention. For example, a process for learning explicitly or implicitly how or what candidates are of interest, can be facilitated via an automatic classification system and process. Classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing user behavior, receiving extrinsic information) so that the classifier is used to automatically determine according to a predetermined criteria which answer to return to a question. For example, with respect to SVM's that are well understood, SVM's are configured via a learning or training phase within a classifier constructor and feature selection module. A classifier is a function that maps an input attribute vector, $x=(x1, x2, x3, x4, xn)$, to a confidence that the input belongs to a class—that is, $f(x)=confidence(class)$.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
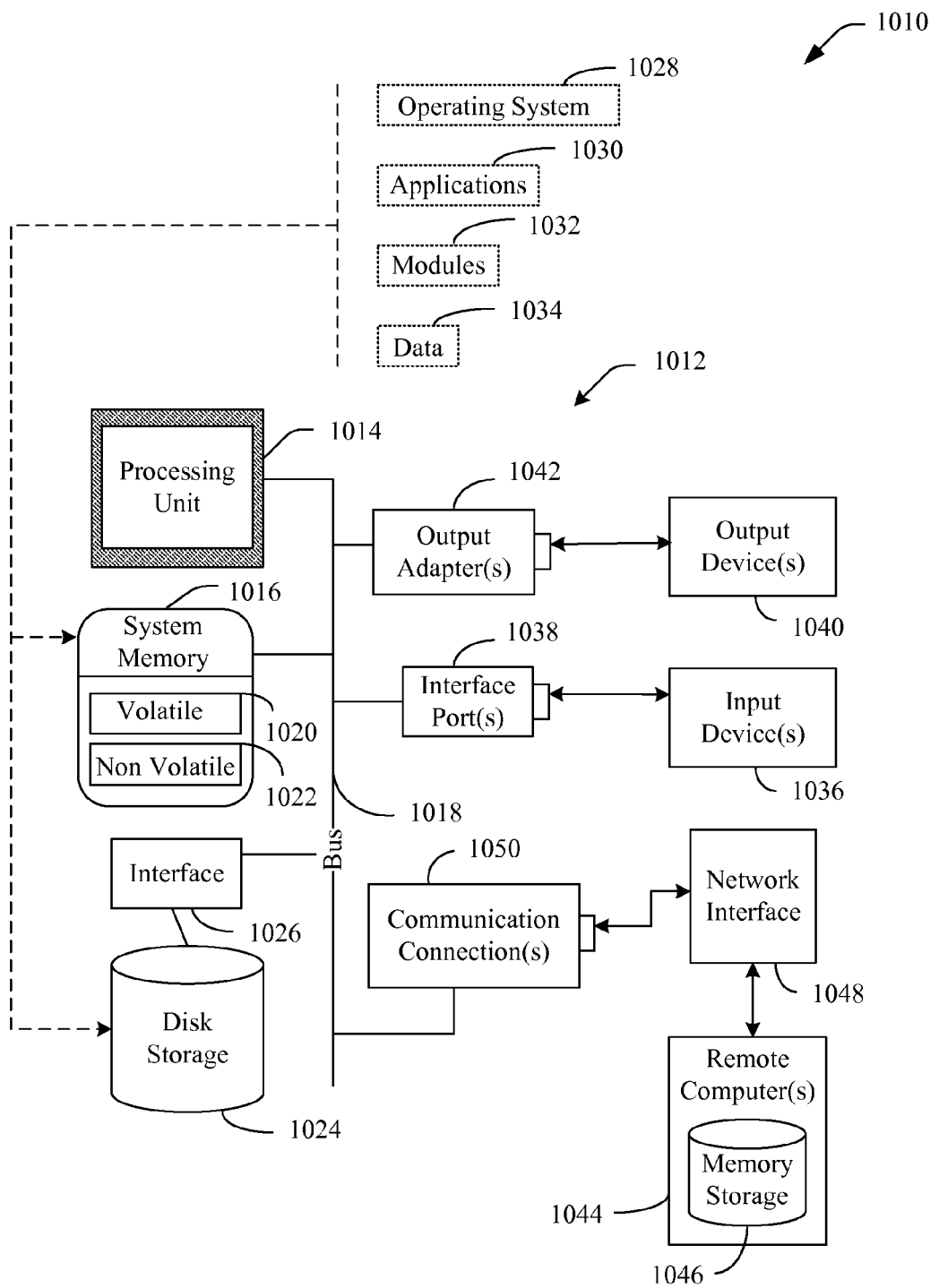
FIG. 10 illustrates an exemplary environment for implementing various aspects of the subject innovation.
Figure 11:
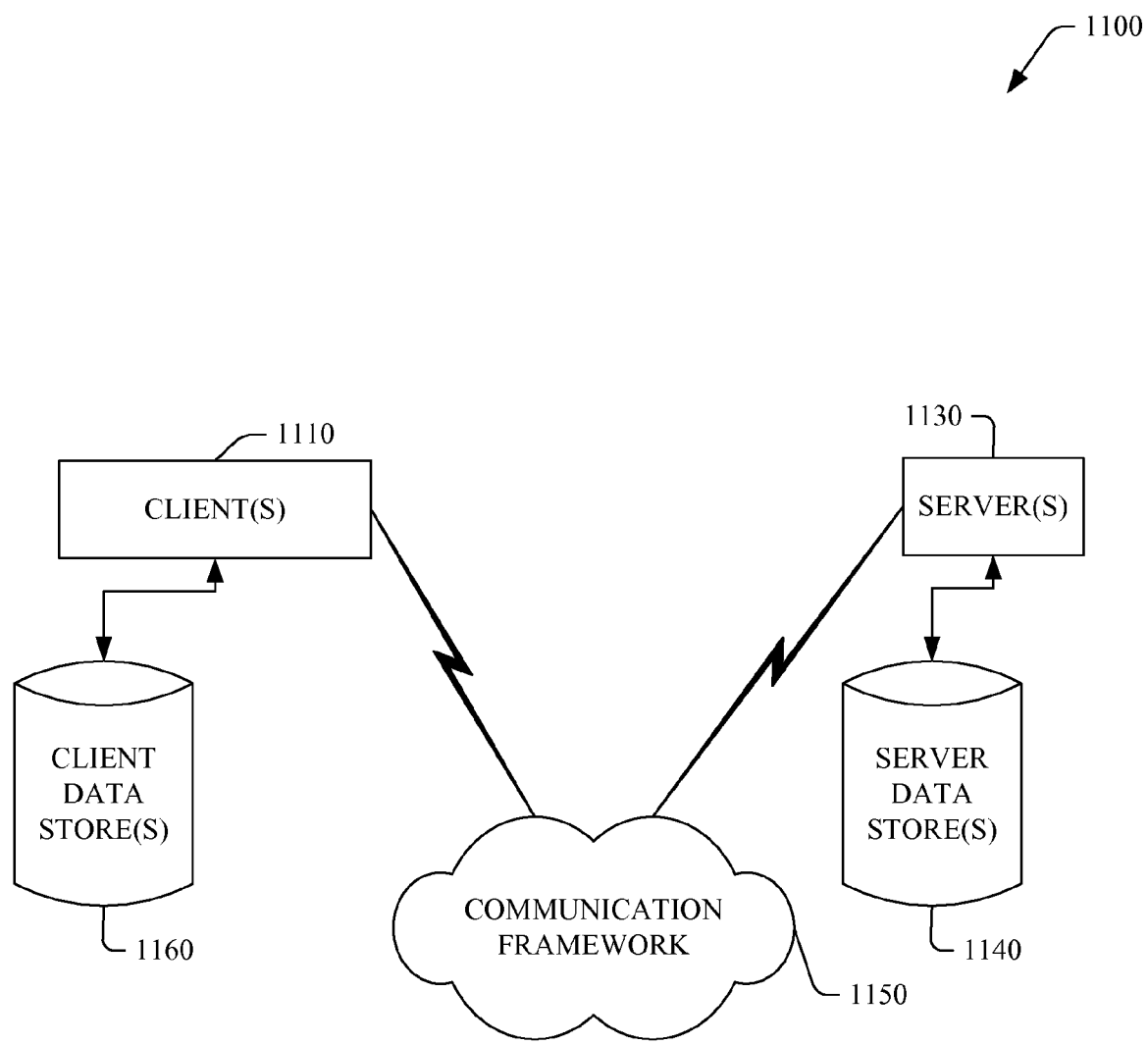
FIG. 11 is a schematic block diagram of a sample-computing environment that can be employed for data replication according to a further aspect of the subject innovation.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules.

As used in this application, the terms "component", "system", "engine" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 10, an exemplary environment 1010 for implementing various aspects of the subject innovation is described that includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates a disk storage 1024, wherein such disk storage 1024 includes, but is not limited to, devices like a magnetic disk drive, floppy disk drive, tape drive, Jaz drive, Zip drive, LS-60 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that various components described herein can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 that can be employed for replicating cache according to an aspect of the subject innovation. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the components described herein, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer implemented method comprising:
   employing a processor to execute computer executable instructions stored on a computer readable medium to perform the following acts:
   designating a read policy model or a write policy model of interacting with a distributed store based on a load associated with the distributed store, or a latency of the distributed store, or a throughput or a combination thereof;
   implementing the read policy or the write policy for the distributed store; and
   synchronizing requests arriving in a local cache of an application with data being held in a primary node of the distributed store.

2. The computer implemented method of claim 1 further comprising determining a load for a primary node of the distributed store based on a delay in response time, or predetermined threshold limits, or periodic polling, or a combination thereof.

3. The computer implemented method of claim 2 further comprising dynamically creating a replica of stored data on-the-fly.

4. The computer implemented method of claim 2, the read policy model or the write policy model is a scalable policy model.

5. The computer implemented method of claim 2, the read policy model or the write policy model is a strong policy model.

6. The computer implemented method of claim 4 further comprising asynchronously writing to back ups in the distributed store.

7. The computer implemented method of claim 5 further comprising ensuring that a primary mode of the distributed store contains most updated version of data.

8. The compute implemented method of claim 1 further comprising implementing a conflict resolution among versions of data as part of the distributed store.

9. The computer implemented method of claim 1 further comprising maintaining a routing table in a client of the distributed store.

10. The computer implemented method of claim 1 further comprising writing to secondary nodes of the distributed store in parallel.

11. The computer implemented method of claim 1 further comprising employing a Logical Sequence Number (LSN) for replicating data in the distributed store.

12. The method of claim 1, wherein the designating is based on the load associated with the distributed store.

13. The method of claim 1, wherein the designating is based on the latency of the distributed store.

14. A computer implemented system that facilitates tracking data changes in a distributed store comprising:
    a processor;
    a memory communicatively coupled to the processor, the memory having stored therein computer-executable instructions configured to implement the computer implemented system including:
    a Common Availability Substrate (CAS) that manages consistency operations for data transfer in a distributed store; and
    a detection component that determines loads for nodes associated with the distributed store.

15. The computer implemented system of claim 14 further comprising a designation component that designates a read policy model or a write policy model for the distributed store.

16. The computer implemented system of claim 14 further comprising a routing table that directs replicated data to a plurality of nodes that form the distributed store.

17. The computer implemented system of claim 14 further comprising a Logical Sequence Number (LSN) generated as part of a replication process associated with the CAS.

18. The computer implemented system of claim 14 the distributed store further comprising
    a layering arrangement that supplies an explicit aggregated cache for applications associated therewith, the layering arrangement includes:
    a distributed object manager component that facilitates abstraction of the explicit aggregated cache in a distributed environment, to a single unified cache; and
    an object manager component that manages policies associated with objects stored in each of nodes that form the single unified cache.

19. The computer implemented system of claim 18 further comprising a data manager component that supplies storage data structures for the objects.

20. The computer implemented system of claim 18 further comprising a clustering substrate that establishes clustering protocols between nodes that form the single unified cache.

21. A computer implemented method comprising:
    employing a processor to execute computer executable instructions stored on a computer readable medium to perform the following acts:
    designating a read policy model or a write policy model of interacting with a distributed store based on a load associated with the distributed store, or a latency of the distributed store, or a throughput or a combination thereof;
    implementing the read policy or the write policy for the distributed store; and
    determining a load for a primary node of the distributed store based on a delay in response time, or predetermined threshold limits, or periodic polling, or a combination thereof.

22. The computer implemented method of claim 21, further comprising determining the load for the primary node based on a combination of the delay in response time, the predetermined threshold limits and periodic polling.

23. A computer implemented method comprising:
   employing a processor to execute computer executable instructions stored on a computer readable medium to perform the following acts:
   designating a read policy model or a write policy model of interacting with a distributed store based on a load associated with the distributed store, or a latency of the distributed store, or a throughput or a combination thereof;
   implementing the read policy or the write policy for the distributed store; and
   employing a Logical Sequence Number (LSN) for replicating data in the distributed store.

24. A storage device having stored computer-executable instructions which, when executed by a computing system having a processor, implement a method that includes:
   employing a processor to execute computer executable instructions stored on a computer readable medium to perform the following acts:
   designating a read policy model or a write policy model of interacting with a distributed store based on a load associated with the distributed store, or a latency of the distributed store, or a throughput or a combination thereof;
   implementing the read policy or the write policy for the distributed store; and
   synchronizing requests arriving in a local cache of an application with data being held in a primary node of the distributed store.

25. The storage device of claim 24 further comprising employing a Logical Sequence Number (LSN) for replicating data in the distributed store.

26. The storage device of claim 24 further comprising synchronizing requests arriving in a local cache of an application with data being held in a primary node of the distributed store.

* * * * *

UNITED STATES PATENT AND TRADEMARK OFFICE
CERTIFICATE OF CORRECTION

PATENT NO.       : 8,151,062 B2                            Page 1 of 1
APPLICATION NO.  : 12/433841
DATED            : April 3, 2012
INVENTOR(S)      : Krishnaprasad et al.

It is certified that error appears in the above-identified patent and that said Letters Patent is hereby corrected as shown below:

In The Specification

In column 7, line 57, delete "asynchrously" and insert -- asynchronously --, therefor.

In The Claims

In column 15, line 60, in Claim 6, delete "back ups" and insert -- backups --, therefor.

In column 15, line 65, in Claim 8, delete "compute" and insert -- computer --, therefor.

Signed and Sealed this
Third Day of February, 2015

Michelle K. Lee
*Deputy Director of the United States Patent and Trademark Office*